United States Patent [19]

Beauducel

[11] Patent Number: 5,206,835
[45] Date of Patent: Apr. 27, 1993

[54] MODULAR DEVICE FOR RECEPTION, THE ACQUISITION AND THE TRANSMISSION OF SEISMIC DATA WITH SEVERAL MULTIPLEXING LEVELS

[75] Inventor: Claude Beauducel, Henonville, France

[73] Assignee: Institut Francais Du Petrole, Rueil-Malmaison, France

[21] Appl. No.: 606,623

[22] Filed: Oct. 31, 1990

[30] Foreign Application Priority Data

Nov. 3, 1989 [FR] France .................... 89 14556

[51] Int. Cl.$^5$ .................... H03G 3/20; G01V 1/22; H04R 9/00
[52] U.S. Cl. .................... 367/21; 367/77; 367/79; 340/825.52
[58] Field of Search ............ 367/21, 27, 77, 79; 181/112; 346/33; 340/825.52, 825.08; 370/85.8

[56] References Cited

U.S. PATENT DOCUMENTS

| | | | |
|---|---|---|---|
| 4,398,271 | 8/1983 | Cretin et al. ................ | 367/79 |
| 4,408,307 | 10/1983 | Harris ........................ | 367/79 |
| 4,523,191 | 6/1985 | Cretin et al. ................ | 340/825.52 |
| 4,583,206 | 4/1986 | Rialan et al. ................ | 367/77 |
| 4,628,493 | 12/1986 | Nelson et al. ................ | 367/79 |
| 4,635,237 | 1/1987 | Benestad et al. ............. | 367/79 |
| 4,779,055 | 10/1988 | Beauducel et al. ........... | 367/67 |
| 4,967,400 | 10/1990 | Woods ........................ | 367/21 |

Primary Examiner—Nelson Moskowitz
Attorney, Agent, or Firm—Antonelli, Terry, Stout & Kraus

[57] ABSTRACT

Modular device for the reception, the acquisition and the transmission, to a central control and recording unit, of signals picked up by a very large number of seismic acoustic receivers distributed along a streamer of great length under water in operation.

The receivers in each one of the sections (Tk) of the streamer are arranged in several groups and the receivers (H1 to Hp) of a same group are connected with an acquisition unit (U1 to Um) located close to them. All the units of each section are connected through digitized command and data transmission lines (LOC,BD) with a common memory and a transmission management unit in an interconnection box (Bk) at one end of the streamer section. Transferring a great part of the electronic equipment into the streamer sections is very favorable for the balancing of the streamer in the water, for obtaining a good signal to noise ratio and it facilitates the development and the exploitation of the material.

11 Claims, 4 Drawing Sheets

MODULAR DEVICE FOR RECEPTION, THE ACQUISITION AND THE TRANSMISSION OF SEISMIC DATA WITH SEVERAL MULTIPLEXING LEVELS

BACKGROUND OF THE INVENTION

The object of the invention is a modular device for the reception, the acquisition and the transmission to a central control and recording station of seismic and acoustic signals in a liquid medium, for use in marine seismic prospecting operations.

With respect to the marine seismic prospecting field, systems for the acquisition and the transmission of seismic signals are contained in sheaths which often have a length of several kilometers and are known as seismic streamers. Seismic streamers are towed under water by a ship along a seismic profile to be explored. Seismic streamers comprise a large number of successive sections interconnected by rigid boxes. Seismic receivers or sensors, each one consisting for example of one or several hydrophones, are distributed along each section. These receivers are connected with an acquisition device located in an interconnection box for sampling, digitizing and storing all the received signals. The different acquisition devices are generally connected with the central laboratory on the ship through common transmission lines divided in two groups. The first group known as outward lines transmits orders or commands addressed to the different devices in the laboratory. A second group known as inward lines transmits to towards the laboratory of the responses of the different devices and notably of the data stored at the end of each seismic emission and reception cycle. A seismic streamer is described for example in French Patent 2,471,088 (U.S. Pat. No. 4,398,271).

The current trend is to lengthen the seismic streamers and to increase the total number of receivers. This allows reduction of the intertrace which is the interval between two adjacent locations of the surveyed seismic profile and an increase in the sharpness of the recording, through the combining and the processing of the recorded signals.

Increasing the number of receivers in each streamer section requires to increasing the integration density of the components of the receivers. The presence of relatively heavy boxes between sections full of a liquid providing a certain buoyancy has the effect of bending the streamer out of shape. The drag of the streamer increases which induces parasitic signals which superpose on the wanted signals.

The length of the connections between the receivers and the acquisition devices, which may reach several ten meters, increases their sensitivity to the noise signals. A solution to the problem caused by the lengthening of the streamers and the resultant increase in the mass of the boxes is described in French Patent 2,590,684 (U.S. Pat. No. 4,787,069) which discloses a streamer having each seismic receiver closely associated with an electronic module for the purpose of adapting the analog signals supplied by the receivers.

The complexity of streamers having a high integration density poses another problem regarding the particular conditions of use imposed by the operators. The structure of highly integrated streamers is often too rigid and makes difficult adapting to operating conditions that had not been anticipated from the outset making usage difficult if not impossible and their cost considerable.

SUMMARY OF THE INVENTION

The present invention provides receiving, acquiring and transmitting seismic and acoustic signals to a central control and recording station in a liquid medium while overcoming the deficiencies of the prior art discussed above.

The invention comprises an elongated sheath consisting of the interconnection of a series of sections. The sections are individually interconnected through interposed boxes. A great number of seismic or acoustic wave receivers are distributed along the sheath providing a modular system of acquisition and transmission to a central control and recording station of the data received by the wave receivers.

The invention includes a set of acquisition devices for collecting the signals produced by the seismic receivers distributed along at least one section of the sheath, a transmission set comprising transmission modules distributed in the interconnection boxes and connected with the central station through digital transmission cables comprising common channels for the transmission of instructions addressed by the central station to the different acquisition devices, means for decoding these instructions and common channels for the transmission of data to the central station the responses from the different acquisition devices.

The invention is characterized as follows:

Each acquisition apparatus comprises means for storing data with a multiplicity of acquisition units arranged in at the one section of the sheath with each one of these acquisition units being located in the sheath close to a multiplicity of seismic receivers for the sequential acquisition of the signals from the receivers with each acquisition unit comprising a local synchronizing element and an analog-to-digital converting means;

The transmission set comprises local lines for the digital transmission of commands which connect a means for decoding orders with the local synchronizing element and local lines for the digital transmission of data which connect all the transmission modules with the data storage means;

Each transmission module comprises means for coding signals transmitted to the central station by the data transmission channels.

In accordance with one embodiment of the invention, the transmission set comprises means for generating a clock signal (H) marking the transmission of the signals on said data transmission channels comprising a clock oscillator in the acquisition box that is farthest from the central control and recording station.

In accordance with another embodiment of the invention, the transmission set comprises means for generating a clock signal marking the transmission of the signals on the data transmission channels comprising clock oscillators located in at least part of the interconnection boxes and switching means for selecting any one of the clock oscillators upon request from the decoding means.

The clock signal is applied for example to each storing means to mark the reading of the digital data therein.

Each acquisition apparatus of the invention can comprise a testing means to check the working condition of the receivers and each acquisition unit.

According to a preferred embodiment of the invention, each seismic receiver is associated with a means for processing the received signals.

Each testing means comprises for example a testing oscillator in an adjacent interconnection box and the signal from the testing oscillator being selectively directed by a switching set in each acquisition unit by request from the local synchronizing element towards the signal processing means associated with each seismic receiver.

The signal processing means of the received signals comprise for example pre-amplifiers and filters receiving the signals produced by the associated seismic receivers, a multiplexer with several inputs to receive the amplified and filtered signals, a binary-gain amplifier, an analog-to-digital converter and an emission synchronizer.

According to one embodiment of the invention the response transmission channel comprises at least one optical fiber.

According to another embodiment of the invention the instruction order transmission channel also comprises at least one optical fiber.

Each transmission channel can also comprise two transmission routes and switches arranged in the interconnection boxes to select routes for the signals entering each of the routes.

The configuration of the invention with its acquisition devices decentralized an acquisition unit located close to the seismic receivers, the control for managing the exchanges distributed in the interconnection boxes and in the acquisition units, and totally digital transmission, at the local level in each section and at the level of the links with the central station provides the following advantages: The electronics are distributed all along the streamer which provides balancing and a decrease in hydrodynamic drag;

The signal-to-noise ratio is clearly improved because the analog links between the receivers and the acquisition units are short and all transfer from and to the control and recording station are in a digital mode. The present invention with its decentralized structure can manage the acquisition of signals from a great number of receivers of up to about thirty seismic "traces". It should be emphasized that the possible concentration in an interconnection box of the electronics necessary for the acquisition of such an amount of signals would be very difficult, and even impossible, if an acceptable noise level was imposed;

The number of acquisition units is increased in relation to prior streamers where the data collection is exclusively achieved in the interconnection boxes. On the other hand, the unit price and the electric consumption of the acquisition units are much lower for a given processing speed and precision because each acquisition unit only has to collect a very limited number of distinct signals.

As a result of the sharing of the functions performed from the ship, exclusively through digitized transmission channels managed by logical decoding units located in the boxes and each acquisition unit, the obtained seismic streamer is easily modifiable. Many modifications may be made in operation cycles, in testing stages as well as in the seismic data collection stages by changing the instructions sent from the central station. The development and exploitation cost is therefore lower.

BRIEF DESCRIPTION OF THE DRAWINGS

Other features and advantages of the method of operation and of the device according to the invention will be clear from reading the description hereafter of the embodiments of the invention and procedures described by way of non limitative examples with reference to the accompanying drawings in which.

DESCRIPTION OF THE PREFERRED EMBODIMENTS

Figure 1:
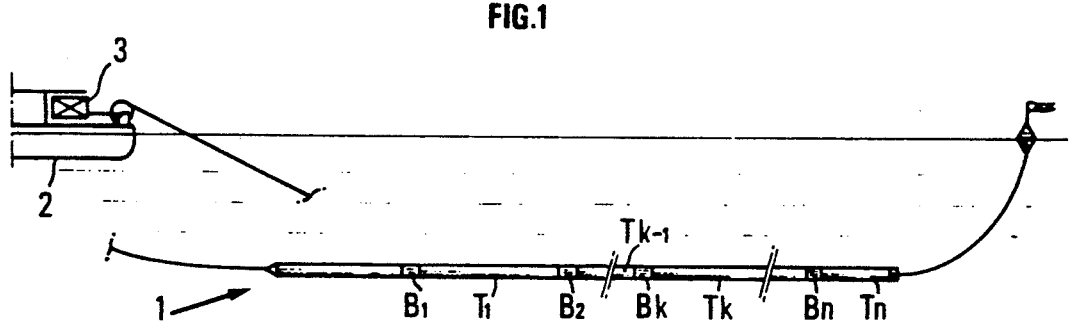
FIG. 1 is a diagram of a marine seismic streamer towed under water.

The seismic streamer shown in FIG. 1 comprises a flexible sheath 1 full of liquid, along which a plurality of seismic receivers are distributed. It is made up of a series of successive sections T1 ... Tk ... Tn linked to one another with rigid interconnection boxes B1 ... Bk ... Bn. In operation, the streamer is towed under water behind a ship 2 fitted with a control and recording station or laboratory 3.

Figure 2:
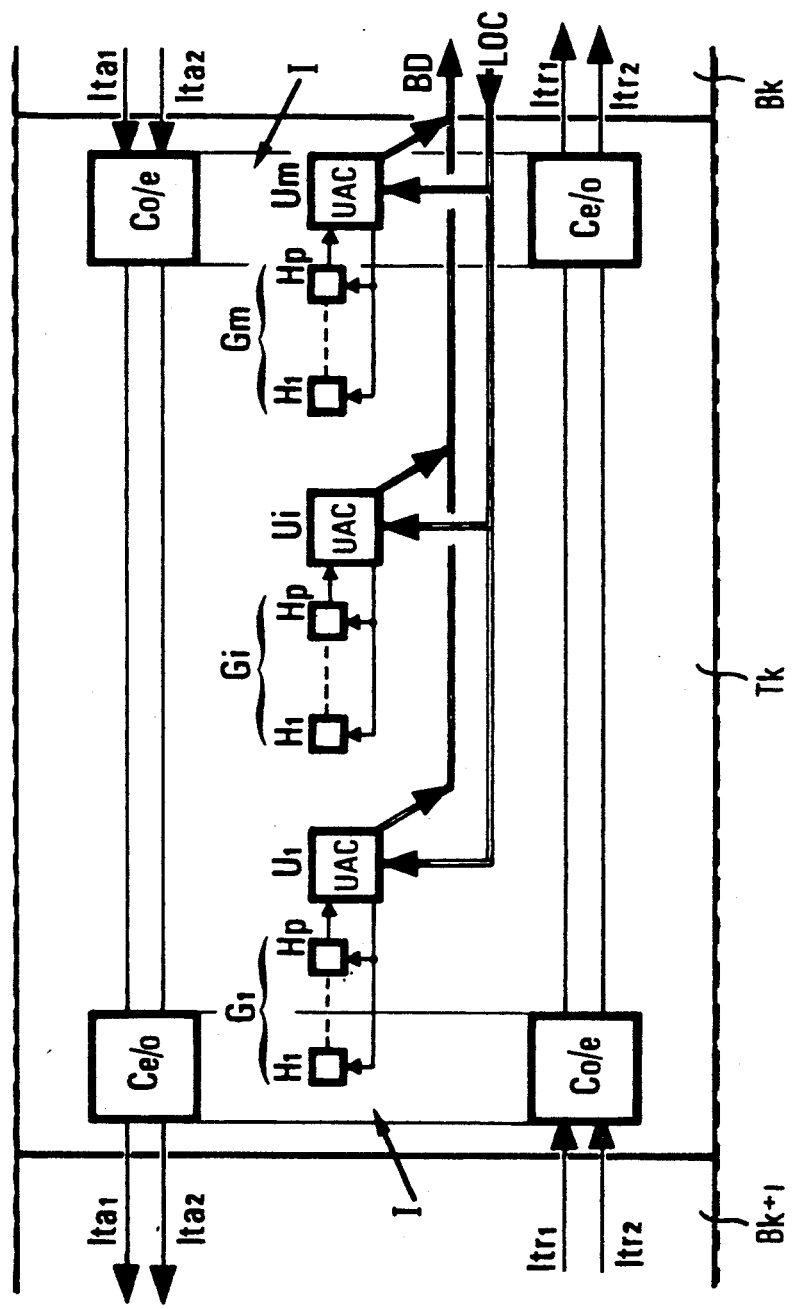
FIG. 2 is a diagram of the arrangement of the receivers and the acquisition units in each section of the streamer.

Along each streamer section (FIG. 2), a plurality of seismic receivers such as hydrophones are distributed. The receivers in each section are distributed in a certain number m of groups G1 ... Gi ... Gm each one containing a set number p of receivers. All the receivers H1 ... Hp of each group are connected by a short pair of twisted conductors to an acquisition unit U1 ... Ui ... Um arranged close to them. For example 28 hydrophones are distributed in each section, and are subdivided into four groups of 7 hydrophones and 4 acquisition units respectively are associated with these four groups.

Figure 3:
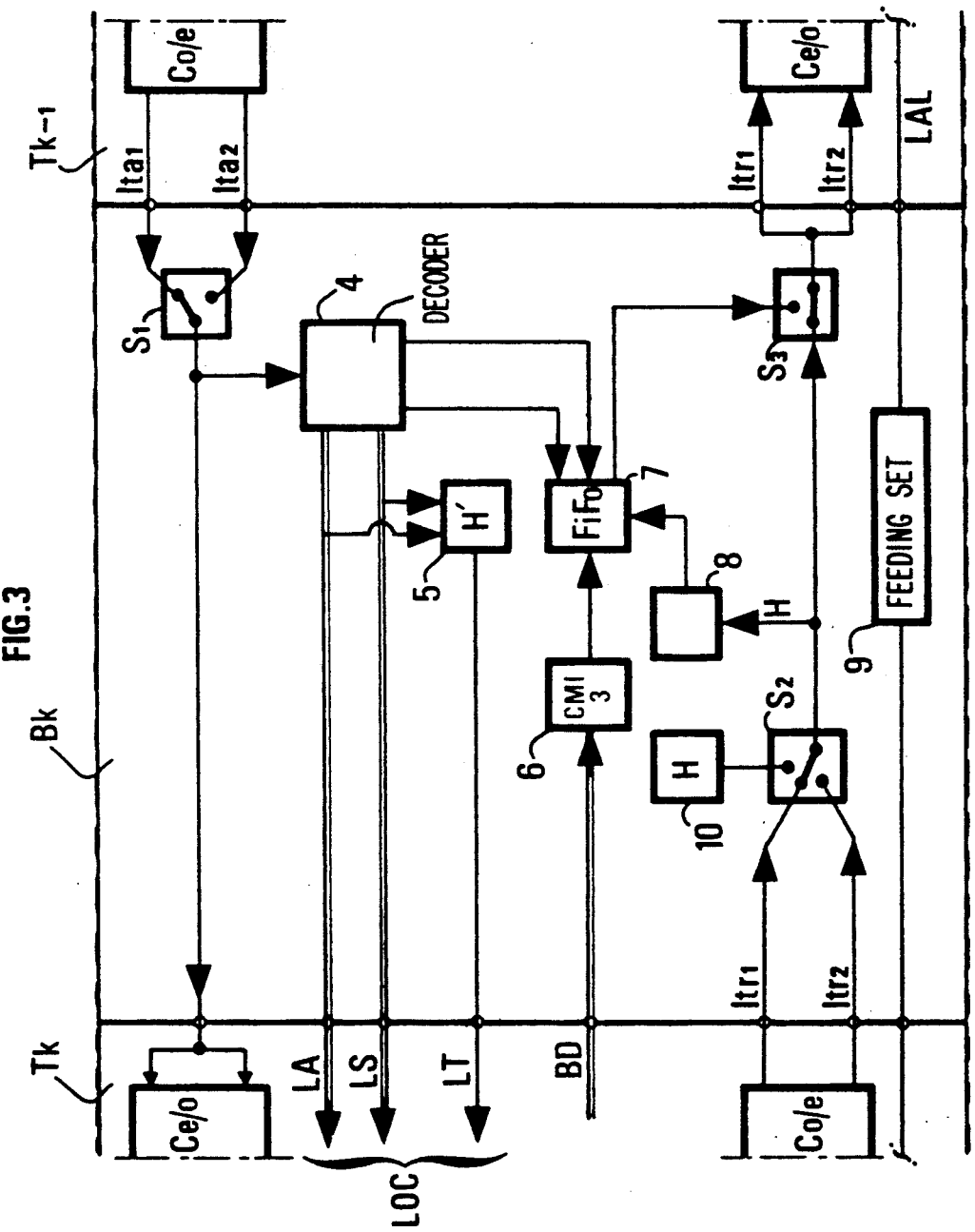
FIG. 3 is a diagram of the electronics contained in each interconnection box.

All the acquisition units U1 to Um of each streamer section are connected with an electronic set arranged in an interconnection box at one end, which will be described in relation with FIG. 3. The link is provided by common command lines LOC for directing orders and instructions towards the acquisition units and a common data bus for returning the responses given by these units.

At least one instruction transmission channel and at least one data transmission channel pass along each streamer section. In order to increase the security of the transmissions, two parallel transmission channels lta1, lta2 for the orders and two parallel transmission channels ltr1, ltr2 for the data are preferably arranged. French Patent 2,469,717 cited above describes how a satisfactory outward transmission line lta1 or lta2 for and a satisfactory outward transmission line ltr1 or ltr2 for data are selected by means of tests carried out previously to the seismic prospecting operations.

In order provide the high transmission rate required for the collecting of the signals picked up by a streamer with a high number of traces and for the transmission management, the outward and inward transmission channels comprise optical fibers. At each end of each section Tk, an interface set I of a well-known type comprising two modules Co/e and Ce/o supplying the necessary conversion. The first module converts the optical signals circulating on the fibers into electric signals and the second module converts the electric signals into optical signals.

In each interconnection box Bk (FIG. 3), the transmissions are carried out by means of electric line sections. The two outward channels lta1 and lta2 are connected to the inputs of a first switch S1. The output of the first switch is connected on one hand in parallel with the two outputs of module Ce/o of the following section Tk, and on the other hand with the input of an order decoder 4.

The central laboratory on the ship sends off on one of channels lta1 or lta2 coded instructions containing addresses designating the interconnection box affected by each instruction. The decoder 4 at the reception of an instruction affecting box Bk separates the addresses that are connected to address lines LA, synchronization signals that are connected to other lines LS. Lines LA and LS are local lines for the digital transmission of commands or instructions. A test oscillator 5 delivering a test signal H' is connected with lines LA and LS and to a line LT. Lines LA, LS and LT constitute a local group of lines LOC. A coding element 6, connected with a data bus BD connected to the acquisition units of the adjacent section Tk, is disposed in each interconnection box Bk as discussed below with reference to FIG. 4. The coding element 6 codes the data arriving on bus BD encoded with the CMI3 code, well-known by specialists for transmission the signals on the optical fibers. The coded data from the coding element 6 is stored a memory 7 which may be of the FIFO type. The writing and reading command inputs of memory 7 are connected with decoder 4. The signal outputted from a clock decoder 8 is applied to the "clock" input of the memory.

The outputs of module Co/e of the adjacent streamer section Tk are connected with two inputs of a second switch having three inputs S2. The output of the switch S2 is connected having a first input of a switch S3 with two inputs. The other input of the switch S3 is connected with the output of the FIFO memory 7. The output of the third switch S3 is connected in parallel with the inputs of module Ce/o which are the return lines ltr1 and ltr2.

Electric supply lines LAL are arranged all along the streamer. In each box Bk a feeding set 9, connected with lines LAL, provides electric voltages for feeding the electronic circuits in the box BK and the adjacent streamer section. The current distribution lines between the feeding set 9 and the electronic circuits are not shown.

The transmission of the signals between the laboratory on board and the different boxes is performed following the quasi-asynchronous transmission method described in French patent application EN 89/14,346. The coded instructions are transmitted from the laboratory on the optical inward fibers lta1 or lta2 following a timing imposed by a first clock at a 2.56 Mbits/s rate. The responses from boxes Bk are transmitted on the return fibers ltr1 or ltr2 following a timing imposed by a second clock located for example in the last box Bn (FIG. 1) at a 32.8 Mbits/s rate. The clock decoder 8 is connected with the output of the second switch S2 in order to extract the clock signal H emitted at the beginning of the return lines ltr1 or ltr2.

In order to ensure the independence of the different boxes in relation to clock H, each box also includes a clock oscillator 10 connected with the third input of the second switch S2 that is able to time on request the transmission of the responses of the boxes below on the return channels ltr1 or ltr2.

Figure 4:
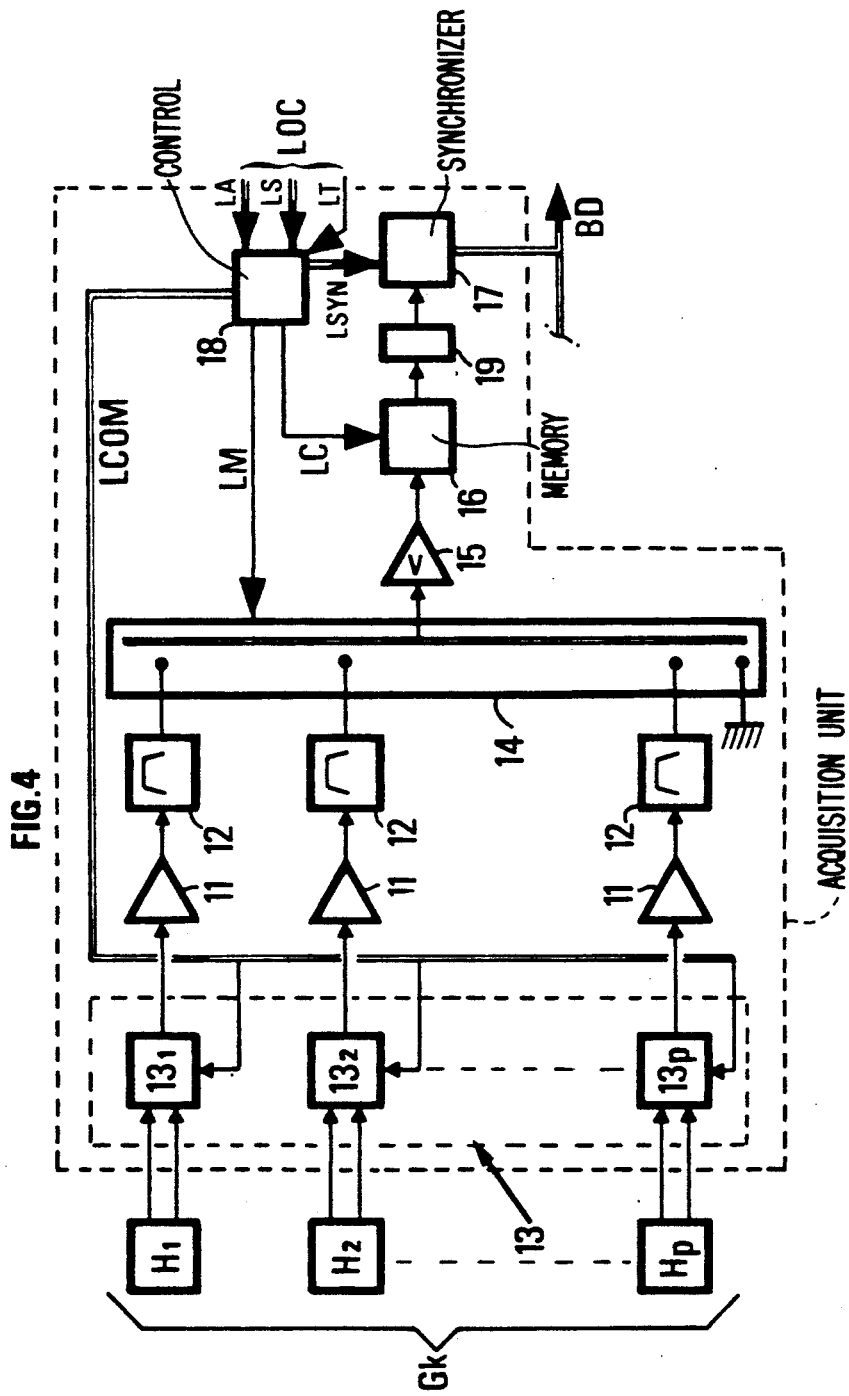
FIG. 4 is a diagram of each acquisition unit arranged in the streamer sections.

The acquisition of the seismic signals in each streamer section is performed by the different units U1 to Up (FIG. 1). FIG. 4 shows that the different receivers H1 to Hp respectively connected with signal adaptation sets. Each adaption set comprises a fixed gain pre-amplifier 11 in series with a bandpass filter 12 the passband of which passes the band of seismic signals to be acquired. A switching set 13 is interposed between each receiver and the input of the corresponding pre-amplifier. Such a switching set is already described in French Patent 2,613,496 (U.S. Pat. No. 4,862,425) assigned to the same applicant.

The signals from the bandpass filters 12 are respectively applied to P inputs of a multiplexer 14 having at least (p+1) inputs. The (p+1)th input is grounds grounded. The signals at the output of multiplexer 14 are applied to a high-dynamic binary-gain amplifier 15 such as those described for example in French Patents 2,593,002 (U.S. Pat. No. 4,779,055) and 2,592,537 (U.S. Pat. No. 4,774,474) assigned to the same applicant. The amplified signals are then digitized in a floating point analog-to-digital converter 16, such as that described in French patent application 2,626,423, also assigned to the same applicant. The digital words that are produced are synchronized by an synchronizer 17 for transmission on data bus BD towards the coder 6 in end box Bk. A local control element 18 is connected with the local group LOC of command transmission lines LA, LS and LT. A data register 19 is preferably interposed between memory 16 and synchronizer 17. Control element 18 is connected to the inputs commanding the switching sets 13 through a set of command lines LCOM. Through other lines LM, LC and LSYN, control 18 respectively sends control signals to multiplexer 14, converter 16 and synchronizer 17. Control 18 decodes the instructions received from the laboratory 3 onboard via the decoding means (4) (FIG. 3) and the local command lines LA, LS, LT, and commands the acquisition operations by the acquisition unit or previous testing operations of each acquisition channel. These testing operations consist of applying the test signal received on line LT to each receiver connected with its acquisition channel, to each channel disconnected from the corresponding receiver or in measuring the background noise level of the total acquisition chain.

All the acquisition units (U1-Um), local command lines LOC and databus BD and memory 7 (FIG. 3) constitute an acquisition apparatus. The set comprising a coder 6, referenced elements 4, 5, 8, 10 and switches S1 to S3 constitutes a transmission module.

The invention works as follows:

The seismic signals picked up by receivers H1 to Hp of each group Gk are multiplexed, amplified, sampled and digitized by the corresponding acquisition chain (11, 12, 14-16) (see FIG. 4). Each digitized sample is transferred into register 19. By means of instructions decoder 4 and of the local control elements of the various acquisition units, the digitized samples of the different registers 19 are sequentially transmitted by the data bus BD into the FIFO memory 7. The same sequential transmission is carried out for all the successive samples from converters 16.

At the end of each seismic emission-reception cycle, the central laboratory controls, by means of instructions decoder 4 in the boxes Bk, the transmission on return lines ltr1 or ltr2 of the content of the different memories 7, following the quasi-asynchronous transmission method mentioned above.

Prior to the launching of the seismic acquisition operations, the transmission outward (lta) and inward (ltr) lines are tested to ensure a faultless bidirectional transmission path between the central laboratory and all the interconnection boxes. The stages are carried out step by step as for the seismic streamer described in the previously cited French Patent 2,471,088 (U.S. Pat. No. 4,398,271). To this effect, a loop which becomes longer and longer is formed and closed successively through all the interconnection boxes B1 to Bn, in order to send back towards the central laboratory, by means of the inward channels, test signals that have been emitted on the outward channels, and the quality of the received signals is checked. A specific instruction transmitted and recognized by decoder 4 (FIG. 3) causes the direct transferring into memory 7 of a test signal and reading and application via switch S3 to the inward channels ltr1 and ltr2. The clock signal H that is necessary for marking the retransmission of the test signal in the loop constituted thereby is obtained by connecting the output of switch S2 on the output of the local clock 10. When the transmission channels have been selected at the end of the successive loopings, the different tests concerning the acquisition apparatuses mentioned above are carried out.

It is within the scope of the invention to replace the registers 19 (FIG. 4) with local memories that could contain at least part of the signals received during one emission-reception cycle and to sequentially transfer their contents into the FIFO memory 7 in the box for transferring them to the central laboratory (3).

I claim:

1. A modular system for transmitting signals received by seismic sensors in an immersed seismic streamer to a central control and recording station on a ship towing the seismic streamer with the streamer comprising a sheath made by a series of connected sections interconnected by interconnection boxes with the sensors being distributed along a length of a plurality of the sections, the modular system including an electronic device comprising:
    a first stage assembly in each interconnection box including transmitting modules connected to the central station through digital transmission cables having outward lines for transmission of commands from the central station and inward lines for transmission of data to the central station, the transmitting modules each having means for decoding commands from the central station, means for storing data and means for coding the data transmitted to the central station through the return lines;
    a second stage assembly in the central station connected with the digital transmission cables for selectively addressing orders to all of the means for decoding through the outward lines and the transmitting modules in the interconnection boxes and for sequentially collecting data stored in the interconnection boxes through said transmitting modules; and
    a third stage assembly having a plurality of acquisition and transmission units, the acquisition and transmission units being distributed along each section and adjacent a group of the sensors in the section and amplifying, multiplexing and digitizing signals received by associated sensors and being interconnected through the digital transmission cables, connected with the transmitting modules including local lines for transmission of commands and local lines for the transmission of data and the local lines for the transmission of data each being coupled to a local synchronizing element linked to the means for decoding and an analog-to-digital converter connected with the means for storing.

2. A device as claimed in claim 1 wherein the transmitting modules comprise:
    means for generating a clock signal marking transmission of the signals on the return lines for the transmission of data including a clock oscillator disposed in the acquisition unit that is most distant from the central control and recording station.

3. A device as claimed in claim 1 wherein the transmitting modules comprise:
    means for generating a clock signal marking transmission of signals on the return lines for the transmission of data including clock oscillators disposed in at least part of all interconnection boxes and switching means for selecting any one of the clock oscillators upon request of the decoding means.

4. A device as claimed in claims 2 or 3 wherein:
    the clock signal is applied to each means for storing to mark reading of digitized data therein.

5. A device as claims in claims 2, 3 and 1 wherein:
    each acquisition unit comprises a means for testing operation of the sensors and the acquisition units.

6. A device as claimed claims 2, 3 and 1 wherein:
    each seismic sensor is associated with a means for processing received signals.

7. A device as claimed in claim 5 wherein:
    each means for testing comprises a test oscillator disposed in an adjacent interconnection box, a signal from the oscillator in an adjacent interconnection box being selectively directed through a switching set into each acquisition unit and upon request of the local synchronization element towards a means for processing associated with each seismic sensor.

8. A device as claimed in claim 7 wherein:
    the means for processing comprises pre-amplifiers and filters for amplifying and filtering the signals produced by associated seismic sensors, and each acquisition unit comprises a multiplexer with a plurality of inputs for receiving the amplified and filtered signals, a binary gain amplifier, an analog-to-digital converter and an emission synchronizer.

9. A device as claimed in claims 2, 3 and 1 wherein:
    the return lines comprise at least one optical fiber.

10. A device as claimed in claim 8 wherein:
    the outward lines also comprise at least one optical fiber.

11. A device as claimed in claim 1 wherein:
    the digital transmission cables comprise two transmission routes and switches disposed in the interconnection boxes to select routes for signals entering each interconnection box and routes for signals outputted from each interconnection box.

* * * * *